(12) United States Patent
Sio et al.

(10) Patent No.: US 12,277,673 B2
(45) Date of Patent: Apr. 15, 2025

(54) IMAGE PROCESSING SYSTEM AND RELATED IMAGE PROCESSING METHOD FOR IMAGE ENHANCEMENT BASED ON REGION CONTROL AND MULTIPLE PROCESSING BRANCH

(71) Applicant: Realtek Semiconductor Corp., HsinChu (TW)

(72) Inventors: Chon Hou Sio, HsinChu (TW); Chia-Wei Yu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 405 days.

(21) Appl. No.: 17/697,904

(22) Filed: Mar. 17, 2022

(65) Prior Publication Data

US 2023/0127608 A1 Apr. 27, 2023

(30) Foreign Application Priority Data

Oct. 25, 2021 (TW) ................................. 110139501

(51) Int. Cl.
*G06T 3/4046* (2024.01)
*G06T 5/20* (2006.01)
*G06T 5/73* (2024.01)

(52) U.S. Cl.
CPC .............. *G06T 3/4046* (2013.01); *G06T 5/20* (2013.01); *G06T 5/73* (2024.01); *G06T 2207/20081* (2013.01); *G06T 2207/20084* (2013.01)

(58) Field of Classification Search
CPC ............ G06T 3/4046; G06T 5/73; G06T 5/60
See application file for complete search history.

(56) References Cited

U.S. PATENT DOCUMENTS

| | | | |
|---|---|---|---|
| 2019/0057509 A1* | 2/2019 | Lv | G06T 7/11 |
| 2020/0396398 A1* | 12/2020 | Romanenko | H04N 25/60 |
| 2021/0150674 A1* | 5/2021 | Cai | G06T 5/60 |
| 2021/0264566 A1* | 8/2021 | Yu | G06T 3/4046 |
| 2022/0067519 A1* | 3/2022 | Mishra | G06V 40/16 |
| 2022/0375037 A1* | 11/2022 | Gu | G06T 5/70 |
| 2023/0177646 A1* | 6/2023 | Li | G06T 3/4053 |
| 2023/0196721 A1* | 6/2023 | Ren | G06T 3/40 |
| | | | 382/274 |

* cited by examiner

*Primary Examiner* — Benjamin O Dulaney
(74) *Attorney, Agent, or Firm* — Winston Hsu (57) ABSTRACT

An image processing system includes: a first image processing device for performing a first image enhancement process on a source image to generate a first enhanced image; one or more second images processing device, each of which is used to perform a second image enhancement processing on a size-reduced image generated based on the source image, and accordingly to output one or more second enhanced images whose size identical to the source image; and an output controller for analyzing regional frequency characteristics of the source image to generate an analysis result, determining one or more region weights according to the analysis result, and synthesize the first enhanced image with the one or more second enhanced images according to the one or more region weights, thereby to generate an output image.

12 Claims, 6 Drawing Sheets

| R0 | R1 | R2 | R3 | R4 | R5 |
|---|---|---|---|---|---|
| R6 | R7 | R8 | R9 | R10 | R11 |
| R12 | R13 | R14 | R15 | R16 | R17 |
| R18 | R19 | R20 | R21 | R22 | R23 |

Regions of source image IMG_S

| A0 | A1 | A2 | A3 | A4 | A5 |
|---|---|---|---|---|---|
| A6 | A7 | A8 | A9 | A10 | A11 |
| A12 | A13 | A14 | A15 | A16 | A17 |
| A18 | A19 | A20 | A21 | A22 | A23 |

Region Weight A

| B0 | B1 | B2 | B3 | B4 | B5 |
|---|---|---|---|---|---|
| B6 | B7 | B8 | B9 | B10 | B11 |
| B12 | B13 | B14 | B15 | B16 | B17 |
| B18 | B19 | B20 | B21 | B22 | B23 |

Region Weight B

IMAGE PROCESSING SYSTEM AND RELATED IMAGE PROCESSING METHOD FOR IMAGE ENHANCEMENT BASED ON REGION CONTROL AND MULTIPLE PROCESSING BRANCH

BACKGROUND OF THE INVENTION

1. Field of the Invention

The present invention relates to image processing, and more particularly, to an image processing device and a related image processing method for image enhancement based on region control and multi-branch processing architecture.

2. Description of the Prior Art

In the deep learning network of image enhancement, if multiple enhancement processing (e.g., super resolution, de-noise, de-blur, and sharpening) are performed at the same time, it is difficult to obtain a balanced and natural enhanced result. Therefore, different enhancements need to be reconciled by interpolation or multi-block architecture. Regarding interpolation, multiple deep learning networks can be trained separately for different types of enhancement processing, thereby outputting multiple enhanced images, and combining these images through weight control. Alternatively, it is also available to interpolate parameters of different deep learning networks, thereby to synthesize different enhancement effects. On the other hand, the multi-block architecture is to set up multiple processing blocks for different types of enhancement processing in a single deep learning network. These processing blocks are trained separately by stages. Multiple types of enhancement effects are combined through weight control over outputs of processing blocks. However, in the interpolation method, the architecture of multiple deep learning networks requires multiple times of inferences to obtain the final result. In addition, it is difficult to finely perform weight control based on regional characteristics during parameters interpolation. Regarding the multi-block architecture, since the processing blocks are attached to a main network, there is a dependency between individual enhancement processing, such that enhancements cannot be performed at the same time. In light of above, there is a need to provide inventive architecture to have progress in the art.

SUMMARY OF THE INVENTION

In view of this, the present invention provides an image processing system and a related method based on multi-branch processing architecture. Such architecture allows different types of image enhancements to be performed in parallel and simultaneously on different branches. Therefore, computing time can be saved. Furthermore, in embodiments of the present invention, a size of the source image is reduced in a part of processing branches when performing enhancement processing. Reduced size images are restored to the original size after processing. Hence, the computational burden of the system can be significantly alleviated. In addition, embodiments of the present invention also use a regional weight control technique, which controls intensities of different types of image enhancement effects according to the regional frequency characteristics of the source image, thereby improving the adjustability of overall enhancement effects, and allowing different enhancement effects to be combined better and more natural Moreover, under the architecture of the present invention, some image processing devices reduce the size of the source image first, and then perform image enhancement. After processing, the reduced size images are restored to the original size of the source image. In view of this, the present invention effectively alleviates computational burden of the system. In addition, the regional weight control technique is also used in the present invention, which controls intensities of different types of image enhancement effects according to the regional frequency characteristics of the source image, thereby increasing the adjustability of overall enhancement effects, allowing different enhancement effects to be combined better and more natural.

According to one embodiment, an image processing system is provided. The image processing system comprises: a first image processing device, one or more second images processing devices and an output controller. The first image processing device has a first deep learning network, and is configured to perform a first image enhancement processing on a source image to generate a first enhanced image. Each of the one or more second image processing devices has a second deep learning network, and is configured to perform a second image enhancement processing on a reduced size image that is generated based on the source image, and accordingly to output one or more second enhanced images whose size identical to that of the source image. The output controller is configured to analyze regional frequency characteristics of the source image to generate an analysis result, determine one or more region weights according to the analysis result, and synthesize the first enhanced image with the one or more second enhanced images according to the one or more region weights, thereby to generate an output image.

According to one embodiment of the present invention, an image processing method is provided. The image processing method comprises: utilizing a first image processing device having a first deep learning network, to perform a first image enhancement processing on a source image to generate a first enhanced image; utilizing one or more second images processing devices, each of which having a second deep learning network, to perform a second image enhancement processing on a reduced size image that is generated based on the source image, and accordingly to output one or more second enhanced images whose size identical to that of the source image; and analyzing regional frequency characteristics of the source image to generate an analysis result and determining one or more region weights according to the analysis result; and synthesizing the first enhanced image with the one or more second enhanced images according to the one or more region weights, thereby to generate an output image.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known structures, materials or steps have not been presented or described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
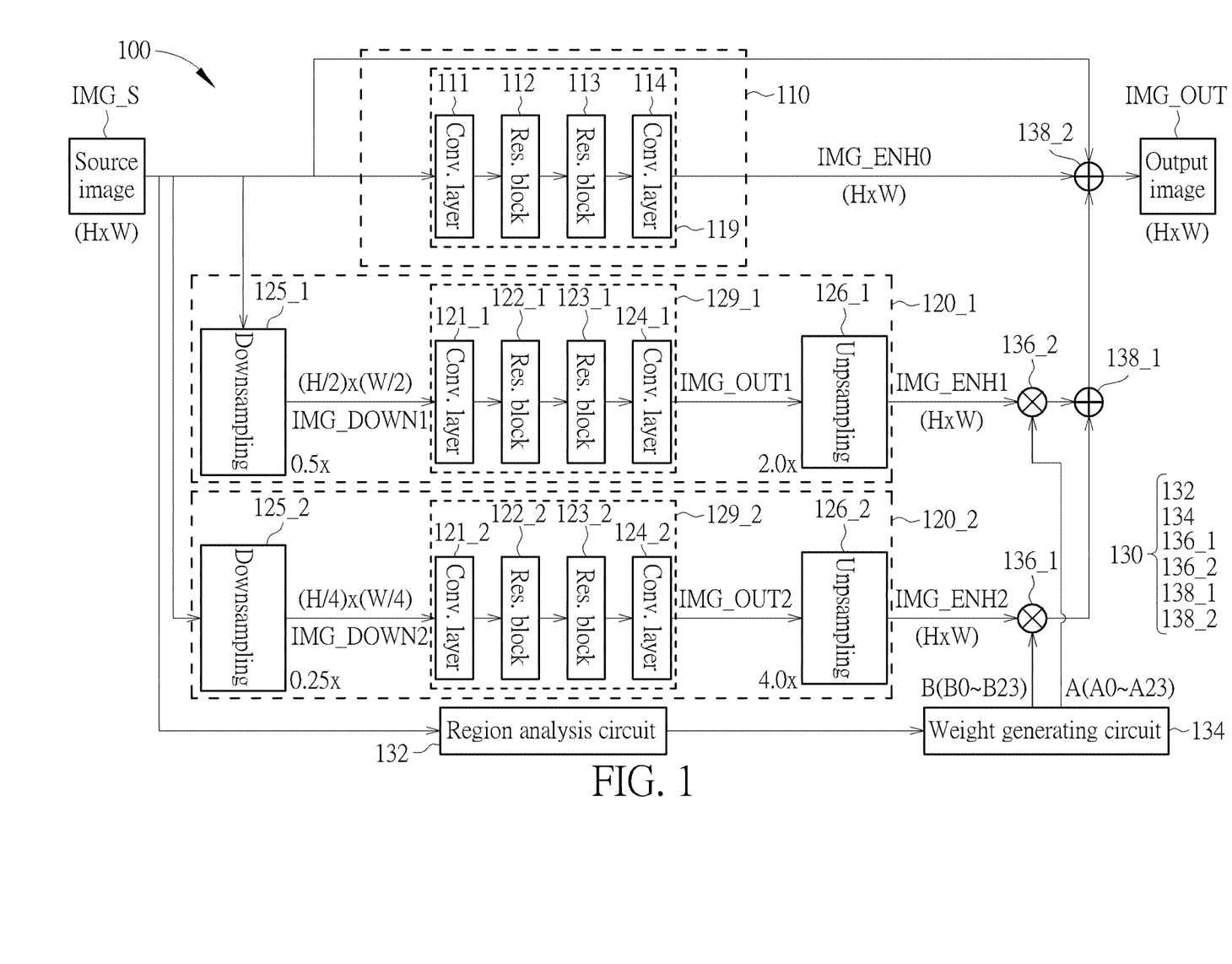
FIG. 1 illustrates a schematic diagram of an image processing system according to a first embodiment of the present invention.

FIG. 1 illustrates a schematic diagram of an image processing system according to one embodiment of the present invention. As shown in the figure, an image processing system 100 of the present invention includes a first image processing device 110, second image processing devices 120_1 to 120_2, and an output controller 130. Please note that, although there are only two second image processing devices 120_1-120_2 shown in the figure, those skilled in the art to which the present invention pertains should be able to understand, from the following descriptions, how to implement an alternative image processing system with more or fewer second image processing devices. Such modifications should still fall within the scope of the present invention.

The first image processing device 110 is typically configured to perform image enhancement processing on a source image IMG_S, while the second image processing devices 120_1-120_2 are configured to perform image enhancement processing on reduced size images that are smaller in size than the source image IMG_S. After the first image processing device 110 and the second image processing devices 120_1-120_2 have completed the image enhancement processing, the output controller 130 will perform an output control over enhanced images generated by the first image processing device 110 and the second image processing devices 120_1-120_2. The output controller 130 assigns weights for the enhanced images generated by different ones of the second image processing devices 120_1-120_2, and accordingly combines the weighted enhanced images with the enhanced image generated by the first image processing device 110.

In this embodiment, the first image processing device 110 comprises a deep learning network 119 including a convolutional layer 111, a residual block 112, a residual block 113, and a convolutional layer 114. The second image processing devices 120_1 comprise a deep learning network 129_1 including a convolutional layer 121_1, a residual block 122_1, a residual block 123_1, and a convolutional layer 124_1. The second image processing devices 120_2 comprise a deep learning network 129_2 including a convolutional layer 121_2, a residual block 122_2, a residual block 123_2, and a convolutional layer 124_2. However, it should be noted that, in some embodiments of the present invention, the first image processing device 110 and the second image processing devices 120_1-120_2 may include other types of deep learning networks different from the architecture shown in FIG. 1. In some embodiments of the present invention, the architectures of the deep learning network included in the first image processing device 110 and the second image processing device 120_1 to 120_2 may be different from each other.

Furthermore, the first image processing device 110 and the second image processing device 120_1 to 120_2 may perform different or identical image enhancement processing, respectively. In one embodiment, the image enhancement processing achievable by the first image processing device 110 includes (but is not limited to): super-resolution, de-noise, and de-blur, or sharpening. In addition, the image enhancement processing achievable by the second image processing devices 120_1-120_2 includes (but is not limited to): super-resolution, de-noise, and de-blur, or sharpening.

The deep learning network 119 in the first image processing device 110 is configured to perform image enhancement processing on the source image IMG_S, thereby outputting an enhanced image IMG_ENH0. The second image processing devices 120_1-120_2 include, respectively, downsampling units 125_1-125_2 for downsampling the source image IMG_S at different reduction ratios, to generate reduced size images IMG_DOWN1 and IMG_DOWN2. The reduced size images IMG_DOWN1 and IMG_DOWN2 will be handed over to the deep learning network 129_1-129_2 for image enhancement. After processing, the deep learning network 129_1-129_2 outputs enhanced images IMG_OUT1 and IMG_OUT2. Furthermore, the second image processing devices 120_1-120_2 have upsampling units 126_1-126_2, respectively, for upsampling the enhanced images IMG_OUT1 and IMG_OUT2 at different magnification ratios, so as to output the enhanced and size-restored images IMG_ENH1 and IMG_ENH2. The magnification ratios for upsampling performed by the upsampling units 126_1-126_2 corresponds to the reduction ratios for downsampling performed by the downsampling units 125_1-125_2. For example, as shown in FIG. 1, the downsampling unit 125_1 can performed downsampling on the source image IMG_S (e.g., the original image size is H×W) by a reduction ratio of 0.5 to scale down the image size (e.g., the reduced image size will be (H/2)×(H/2)), while the upsampling unit 126_1 performs upsampling on the enhanced image IMG_OUT1 by a magnification ratio of 2 to restore/scale up the image size (e.g., the restored image size will be H×W). In addition, the downsampling unit 125_2 can performed downsampling on the source image IMG_S by a reduction ratio of 0.25 to scale down the image size (e.g., the reduced image size will be (H/4)×(H/4)), while the upsampling unit 126_2 performs upsampling on the enhanced image IMG_OUT2 by a magnification ratio of 4 to restore/scale up the image size. However, this is nota limitation of the present invention. According to various embodiments of the present invention, the downsampling units 125_1-125_2 may use downsampling rates (e.g., reduction ratios) different from those in the above embodiment to obtain images IMG_DOWN1 and IMG_DOWN2. The upsampling units 126_1-126_2 only need to restore the images IMG_OUT1 and IMG_OUT2 to have the same size as the source image IMG_S. In one embodiment, a reduction ratio for a source image may be associated with a type of image enhancement processing to be performed. For example, if the deep learning network 129_1 is configured to perform noise reduction or super-resolution, the downsampling unit 125_1 may be configured to perform downsampling at a larger reduction ratio, scaling down the source image with to a smaller size. This is because such types of image enhancement processing may require more computing power and transmission bandwidth of the image processing system 100. Thus, performing image enhancement on smaller images could reduce requirements on system's computing power and transmission bandwidth.

Figure 2:
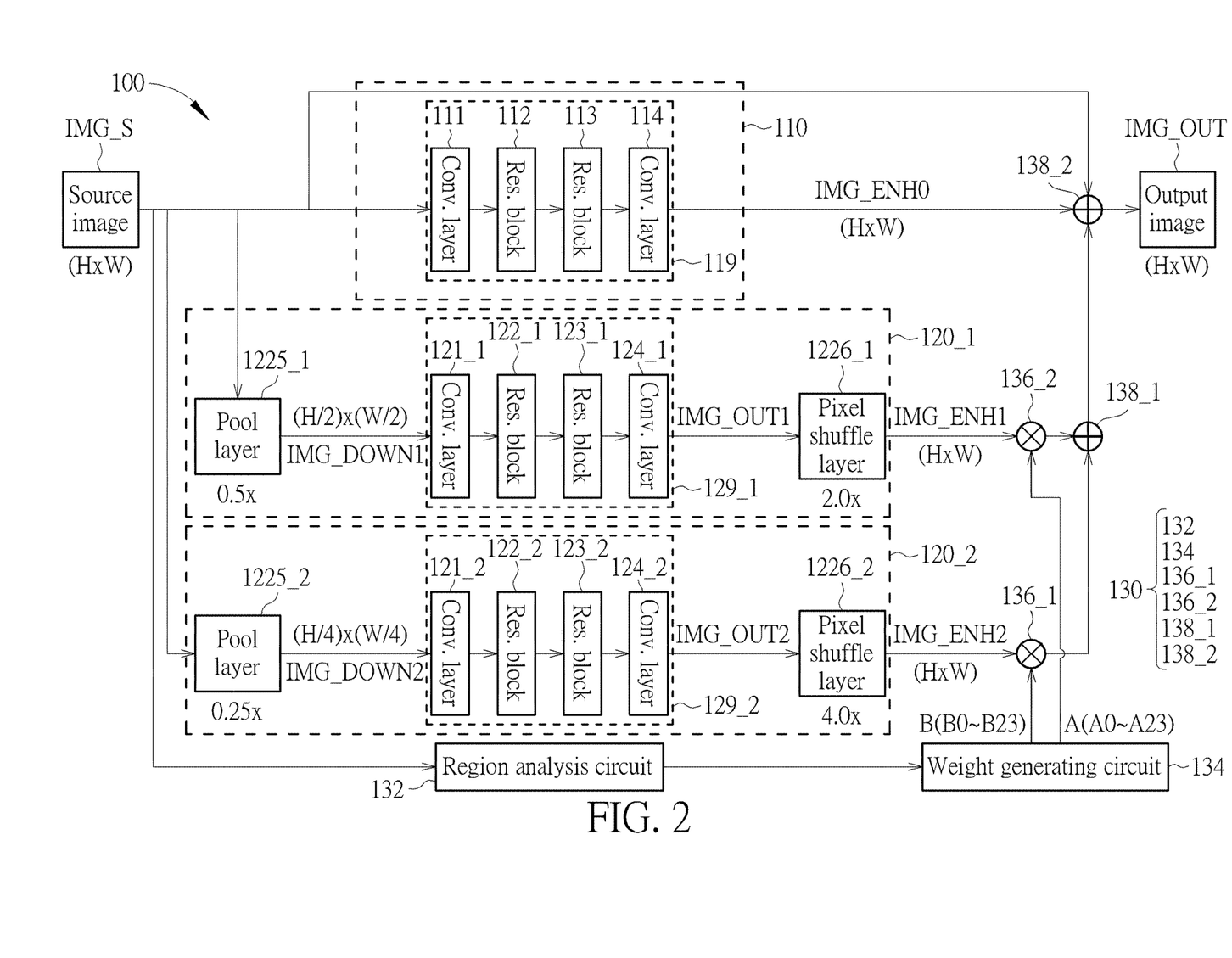
FIG. 2 illustrates a schematic diagram of an image processing system according to a second embodiment of the present invention.
Figure 3:
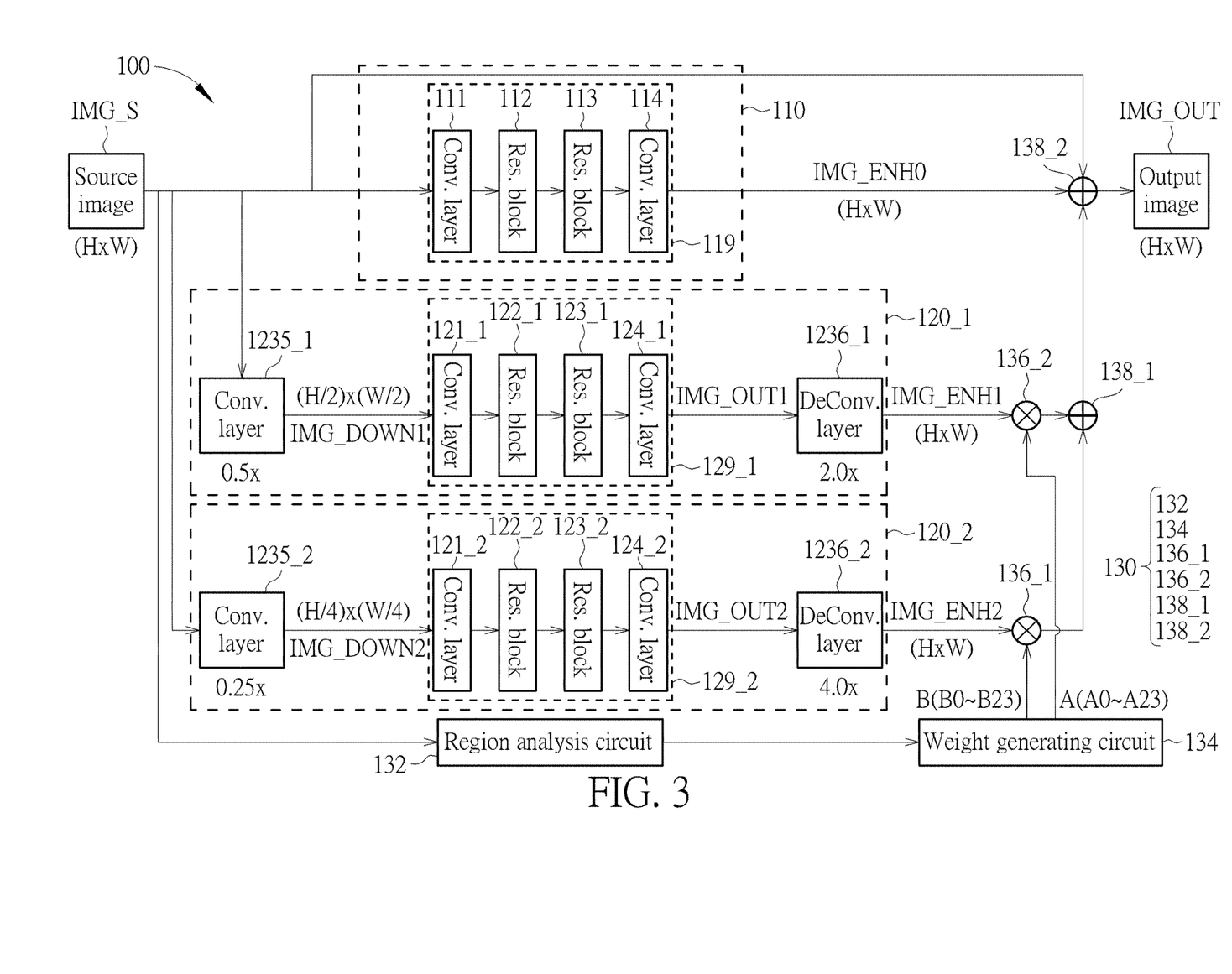
FIG. 3 illustrates a schematic diagram of an image processing system according to a third embodiment of the present invention.

In addition to architecture shown in FIG. 1, some embodiments of the present invention provide different architectures. Please refer to FIG. 2. As illustrated, the downsampling units 125_1-125_2 in the second image processing devices 120_1-120_2 can be replaced with pooling layers of the deep learning network 129_1-129_2. As is well known to those skilled in the art, the pooling layer can be used for data compression in deep learning networks. Therefore, the pooling layers 1225_1-1225_2 in the embodiment can be used to reduce the size of the source image IMG_S. Moreover, the upsampling units 126_1-126_2 can be replaced with pixel shuffle layers in the deep learning network. The pixel shuffle layers 1226_1-1226_2 can perform super-resolution processing on the images IMG_OUT1 and IMG_OUT2 to generate images having the same image size as that of the source images IMG_S. Furthermore, in an embodiment shown in FIG. 3, the downsampling units 125_1-125_2 in the second image processing devices 120_1-120_2 can also be replaced with convolutional layers in the deep learning network. As the stride of the convolutional layers 1235_1-1235_2 is set as "N", the size of the source image IMG_S can be reduced. The upsampling unit 126_1-126_2 can be replaced with deconvolutional Layers in the deep learning network. The deconvolutional Layers 1236_1-1236_2 can restore the size of the image IMG_OUT1 and IMG_OUT2 to be the same as that of the source image IMG_S.

Figure 4:
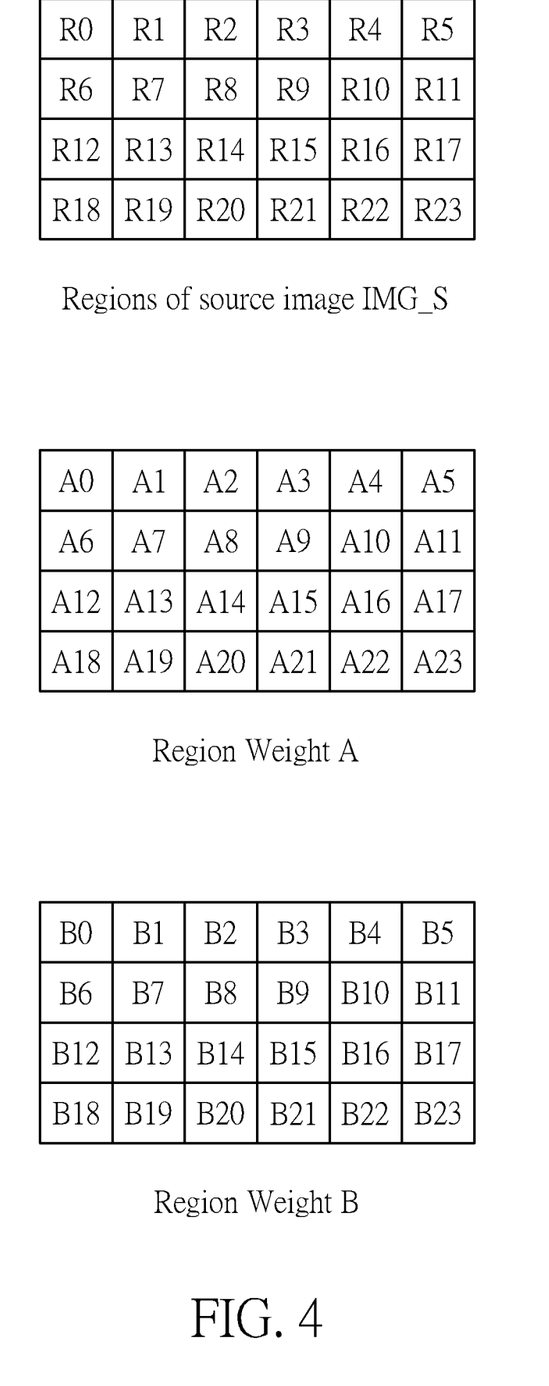
FIG. 4 illustrates how to generate region weights according to one embodiment of the present invention.

The output controller 130 is configured to combine the enhanced image IMG_ENH0 output by the first image processing device 110 and the enhanced images IMG_ENH1-IMG_ENH2 output by the second image processing device 120_1-120_2. The output controller 130 includes a region analysis circuit 132, a weight generating circuit 134, multiplying units 136_1-136_2, and adding units 138_1-138_2. The function of the output controller 130 is to detect regional frequency characteristics of the source image IMG_S, and to determine synthesis intensities for the enhanced images according to the regional frequency characteristics, so as to achieve a fine control over image enhancement effects. The region analysis circuit 132 is configured to perform region analysis on the source image IMG_S. The region analysis circuit 132 may include a Sobel Filter, a discrete cosine transform unit, or a convolution neural network (CNN) to transform the source image IMG_S into frequency domain. In this way, the frequency distribution of the source image IMG_S (that is, high/low frequency components relative to regions of the source image) is obtained. In an embodiment shown in FIG. 4, the region analysis circuit 132 may divide the source image IMG_S into 6×4 regions R0-R23, and determine the regional frequency characteristics according to the frequency distribution to generate an analysis result. The weight generating circuit 134 is configured to generate a region weight A corresponding to the enhanced image IMG_ENH1 and a region weight B corresponding to the enhanced image IMG_ENH2 according to the analysis result. As shown in FIG. 4, the region weights A and B contain 6×4 weight coefficients A0-A23 and B0-B23, respectively, indicating synthesis intensities for the enhanced image IMG_ENH1 and the enhanced image IMG_ENH2 relative to the enhanced image IMG_ENH0 region by region. For example, a weight coefficient A11 of the region weight A indicates a synthesis intensity that should be used when a region of the enhanced image IMG_ENH1 corresponding to a region R11 of the source image IMG_S is synthesized with a region of the enhanced image IMG_ENH0 corresponding to the region R11 of the source image IMG_S. A weight coefficient B11 of the region weight B indicates a synthesis intensity that should be used when a region of the enhanced image IMG_ENH2 corresponding to a region R15 of the source image IMG_S is synthesized with a region of the enhanced image IMG_ENH0 corresponding to the region R15 of the source image IMG_S. It should be noted that the number of regions that the source image is divided into, as well as the number of weight coefficients in the region weights are not limitations of the present invention. According to various embodiments of the present invention, there should be other combinations. On the other hand, when determining the region weight A and the region weight B, types of the image enhancement processing performed by the second image processing devices 120_1-120_2 and the regional frequency characteristics of the source image IMG_S may be both taken into consideration. For example, with respect to high-frequency regions of the source image IMG_S, higher weight coefficients may be applied in order to enhance a sharpening process performed by one of the second image processing devices 120_1 and 120_2, thereby to strengthen edges and details of the image. With respect to low-frequency regions of the source image IMG_S, higher weight coefficients may be applied in order to enhance a super-resolution processing performed by the other of the second image processing device 120_1 and 120_2, thereby to restore details that are lost in the low-frequency regions. Once the weight generating unit 134 determines the region weights A and B, the multiplying units 136_1-136_2 and the adding units 138_1-138_2 can use the weight coefficients A0-A23 to B0-B23 to synthesize the enhanced image IMG_ENH0 with the enhanced images IMG_ENH1 and IMG_ENH2, producing output image IMG_OUT with multiple enhancement effects.

Figure 5:
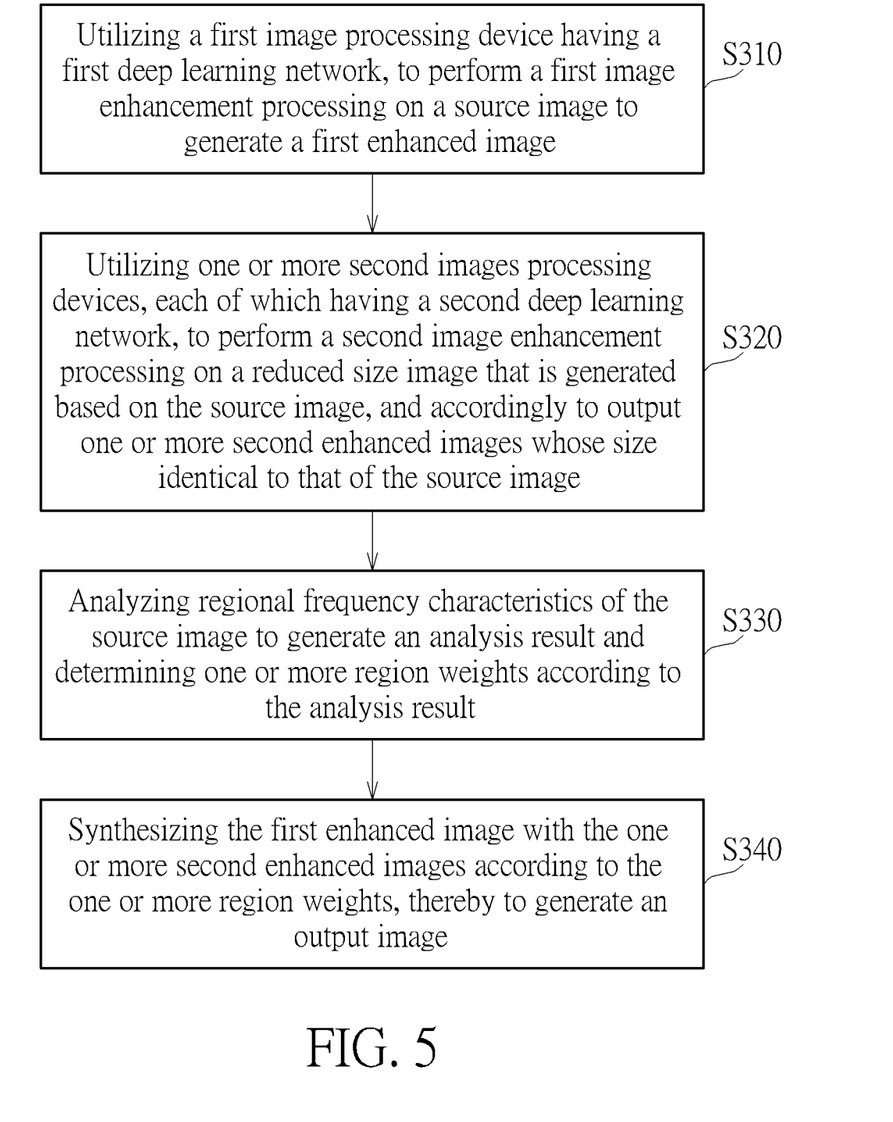
FIG. 5 illustrates a flow chart of an image processing method of according to one embodiment of the present invention.

FIG. 5 illustrates a flow chart of an image processing method according to one embodiment of the present invention. As shown in the figure, the image processing method includes the following steps:

S310: utilizing a first image processing device having a first deep learning network, to perform a first image enhancement processing on a source image to generate a first enhanced image;

S320: utilizing one or more second images processing devices, each of which having a second deep learning network, to perform a second image enhancement processing on a reduced size image that is generated based on the source image, and accordingly to output one or more second enhanced images whose size identical to that of the source image;

S330: analyzing regional frequency characteristics of the source image to generate an analysis result and determining one or more region weights according to the analysis result; and S340: synthesizing the first enhanced image with the one or more second enhanced images according to the one or more region weights, thereby to generate an output image.

Figure 6:
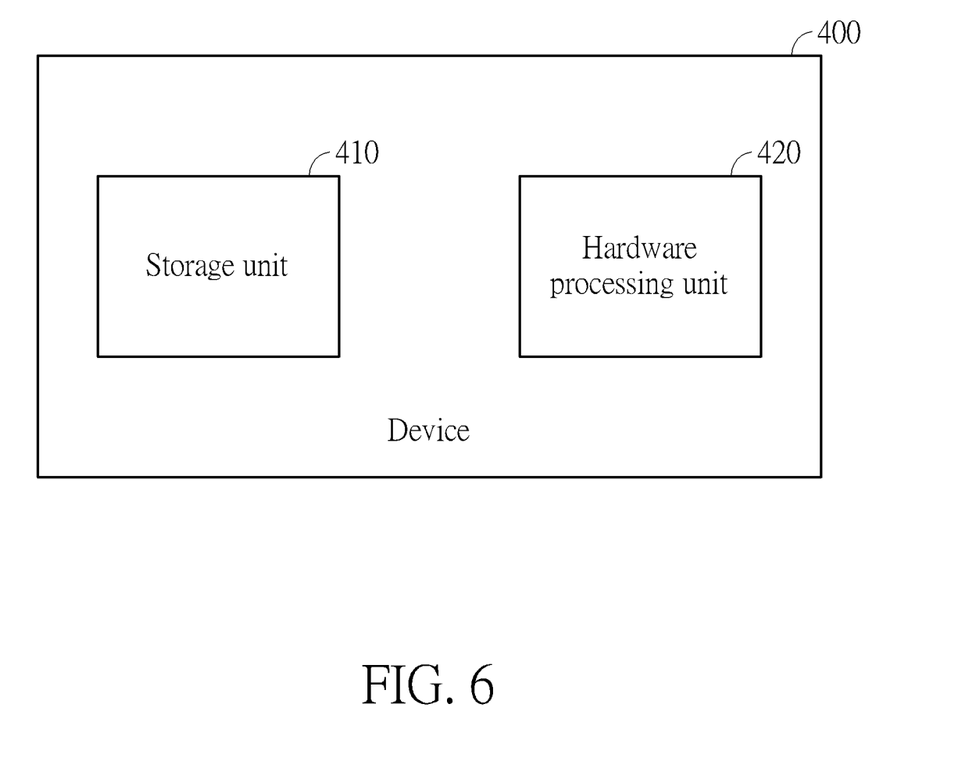
FIG. 6 illustrates how to implement an image processing method using a hardware device according to one embodiment of the present invention.

Since the principle and specific details of the foregoing steps have been described expressly in the above embodiments, further descriptions will not be repeated here. It should be noted that the above flow may achieve better enhancement processing and further improve overall enhancement effect by adding other extra steps or making appropriate modifications and/or adjustments. Furthermore, all the operations in the above embodiments can be implemented by a device 400 shown in FIG. 6, wherein a storage unit 410 (e.g., non-volatile memory) in the device 400 can be used to store program codes, commands, variables, or data. A hardware processing unit 420 (e.g., a general-purpose processor) in the device 400 can execute the program codes and instructions stored in the storage unit 410, and refer to the variables or data therein to perform all the operations in the above embodiments.

In summary, multi-branch image processing architecture provided by the present invention can allow different types of image enhancement processing to be performed in parallel and simultaneously, thereby reducing computing time. Moreover, under the architecture of the present invention, some image processing devices reduce the size of the source image first, and then perform image enhancement. After processing, the reduced size images are restored to the original size of the source image. In view of this, the present invention effectively alleviates computational burden of the system. In addition, the regional weight control technique is also used in the present invention, which controls intensities of different types of image enhancement effects according to the regional frequency characteristics of the source image, thereby increasing the adjustability of overall enhancement effects, allowing different enhancement effects to be combined better and more natural.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system, comprising:
   a first image processing device, having a first deep learning network, configured to perform a first image enhancement processing on a source image to generate a first enhanced image;
   one or more second images processing devices, each of which having a second deep learning network, configured to perform a second image enhancement processing on a reduced size image that is generated based on the source image, and accordingly to output one or more second enhanced images whose size is identical to that of the source image; wherein a reduction ratio of the reduced size image relative to the source image is determined based on a type of the second image enhancement processing; and
   an output controller, configured to analyze regional frequency characteristics of the source image to generate an analysis result, determine one or more region weights according to the analysis result, and synthesize the first enhanced image with the one or more second enhanced images according to the one or more region weights, thereby to generate an output image, wherein the one or more weights are determined based on the regional frequency characteristics of the source image and the type of the second image enhancement processing;
   wherein the first image enhancement processing is different from the second image enhancement processing, and the first and second image enhancement processing respectively include at least one of super resolution, de-noise, de-blur and sharpening processing.

2. The image processing system of claim 1, wherein the output controller comprises:
   a region analysis circuit, configured to divide the source image into N×M regions, and respectively determine a plurality of regional characteristics of the N×M region, thereby to obtain the analysis result; and
   a weight determining circuit, coupled to the region analysis circuit, configured to determine a plurality of weight coefficients respectively corresponding to the N×M regions according to the analysis result, wherein the one or more region weights is composed of the plurality of weight coefficients.

3. The image processing system of claim 1, wherein each of the one or more second image processing devices comprises:
a downsampling unit, configured to scale down the source image, thereby to generate the reduced size image; and
an upsampling unit, configured to scale up a processed image output by the second deep learning network, thereby to generate the second enhanced image.

4. The image processing system of claim 1, wherein each of the one or more second image processing devices comprises:
a pooling layer, configured to scale down the source image, thereby to generate the reduced size image; and
a pixel shuffling layer, configured to scale up a processed image output by the second deep learning network, thereby to generate the second enhanced image.

5. The image processing system of claim 1, wherein each of the one or more second image processing devices comprises:
a convolutional layer, having a stride of N, configured to scale down the source image, thereby to generate the reduced size image; and
a deconvolutional layer, configured to scale up a processed image output by the second deep learning network, thereby to generate the second enhanced image.

6. The image processing system of claim 1, wherein the image processing system comprises a plurality of second image processing devices, and the plurality of second image processing devices respectively scale down the source image by different reduction ratios before performing image enhancement processing; and the plurality of second image processing devices respectively performs image enhancement processing on a plurality of reduced size images that are scaled down by different reduction ratios.

7. An image processing method, comprising:
utilizing a first image processing device having a first deep learning network, to perform a first image enhancement processing on a source image to generate a first enhanced image;
utilizing one or more second images processing devices, each of which having a second deep learning network, to perform a second image enhancement processing on a reduced size image that is generated based on the source image, and accordingly to output one or more second enhanced images whose size is identical to that of the source image, comprising:
determining a reduction ratio of the reduced size image relative to the source image based on a type of the second image enhancement processing;
analyzing regional frequency characteristics of the source image to generate an analysis result and determining one or more region weights according to the analysis result, comprising:
determining the one or more weights based on the regional frequency characteristics of the source image and the type of the second image enhancement processing; and
synthesizing the first enhanced image with the one or more second enhanced images according to the one or more region weights, thereby to generate an output image;
wherein the first image enhancement processing is different from the second image enhancement processing, and the first and second image enhancement processing respectively include at least one of super resolution, de-noise, de-blur and sharpening processing.

8. The image processing method of claim 7, wherein the step of analyzing regional frequency characteristics of the source image comprises:
dividing the source image into N×M regions, and respectively determining a plurality of regional characteristics of the N×M region, thereby to obtain the analysis result; and
the step of determining the one or more region weights comprises:
determining a plurality of weight coefficients respectively corresponding to the N×M regions according to the analysis result, wherein the one or more region weights is composed of the plurality of weight coefficients.

9. The image processing method of claim 7, wherein the step of performing the second image enhancement processing comprises:
utilizing a downsampling unit to scale down the source image, thereby to generate the reduced size image; and
utilizing an upsampling unit to scale up a processed image output by the second deep learning network, thereby to generate the second enhanced image.

10. The image processing method of claim 7, wherein the step of performing the second image enhancement processing comprises:
utilizing a pooling layer to scale down the source image, thereby to generate the reduced size image; and
utilizing a pixel shuffling layer to scale up a processed image output by the second deep learning network, thereby to generate the second enhanced image.

11. The image processing method of claim 7, wherein the step of performing the second image enhancement processing comprises:
utilizing a convolutional layer having a stride of N, to scale down the source image, thereby to generate the reduced size image; and
utilizing a deconvolutional layer to scale up a processed image output by the second deep learning network, thereby to generate the second enhanced image.

12. The image processing method of claim 7, further comprising:
utilizing a plurality of second image processing devices to respectively scale down the source image by different reduction ratios; and
utilizing the plurality of second image processing devices to perform image enhancement processing on a plurality of reduced size images that are scaled down by different reduction ratios.

* * * * *